US010494954B2

(12) United States Patent
Hartwich

(10) Patent No.: US 10,494,954 B2
(45) Date of Patent: Dec. 3, 2019

(54) CONNECTION SYSTEM FOR HOUSING ELEMENTS OF A TURBINE INTERMEDIATE CASING

(71) Applicant: MTU Aero Engines AG, Munich (DE)

(72) Inventor: Andreas Hartwich, Karlsfels (DE)

(73) Assignee: MTU Aero Engines AG, Munich (DE)

( * ) Notice: Subject to any disclaimer, the term of this patent is extended or adjusted under 35 U.S.C. 154(b) by 329 days.

(21) Appl. No.: 15/429,414

(22) Filed: Feb. 10, 2017

(65) Prior Publication Data

US 2017/0234163 A1 Aug. 17, 2017

(30) Foreign Application Priority Data

Feb. 16, 2016 (EP) ..................................... 16155900

(51) Int. Cl.
*F01D 25/24* (2006.01)
*F16B 2/06* (2006.01)
(Continued)

(52) U.S. Cl.
CPC ........... *F01D 25/243* (2013.01); *F01D 9/065* (2013.01); *F01D 25/162* (2013.01); *F01D 25/26* (2013.01);
(Continued)

(58) Field of Classification Search
CPC ...... F01D 9/065; F01D 25/162; F01D 25/243; F01D 25/26; F02C 7/20; F16B 2/065;
(Continued)

(56) References Cited

U.S. PATENT DOCUMENTS 4,840,026 A * 6/1989 Nash ..................... F01D 25/265
285/330
4,921,401 A * 5/1990 Hall ......................... F01D 9/04
403/28
(Continued)

FOREIGN PATENT DOCUMENTS

EP 1939459 7/2008
FR 2692006 12/1993
(Continued)

*Primary Examiner* — Igor Kershteyn
(74) *Attorney, Agent, or Firm* — Davidson, Davidson & Kappel, LLC

(57) ABSTRACT

A connection system for a hot gas-conducting annular duct of a turbine intermediate casing of a gas turbine includes a first housing element, a second housing element situated next to the first housing element in the circumferential direction, and a fastening unit configured for connecting the first housing element and the second housing element to one another at edges adjacent to one another in the circumferential direction, the fastening unit including a clamping element which is mounted on the one housing element with the aid of a connection, the clamping element resting on a clamping surface provided on the other housing element in such a way that the other housing element is accommodated between the clamping element and the one housing element. It is provided that the top side of the clamping surface facing the clamping element has a clamping surface contour —relative to a longitudinal section which extends along, in particular essentially in parallel to the adjacent edges of the two housing elements —which is designed in such a way that it thwarts a rotation of the clamping element about an axis of the connection.

17 Claims, 3 Drawing Sheets

(51) Int. Cl.
*F01D 9/06* (2006.01)
*F01D 25/16* (2006.01)
*F01D 25/26* (2006.01)
*F16B 2/14* (2006.01)
*F02C 7/20* (2006.01)
*F16B 43/02* (2006.01)
*F16B 1/00* (2006.01)

(52) U.S. Cl.
CPC .............. *F02C 7/20* (2013.01); *F16B 2/065* (2013.01); *F16B 2/14* (2013.01); *F16B 43/025* (2013.01); *F05D 2220/32* (2013.01); *F05D 2220/323* (2013.01); *F05D 2230/60* (2013.01); *F05D 2260/311* (2013.01); *F16B 2001/0078* (2013.01)

(58) Field of Classification Search
CPC .. F16B 2/14; F16B 43/025; F16B 2001/0078; F05D 2220/32; F05D 2220/323; F05D 2230/60; F05D 2260/311
See application file for complete search history.

(56) References Cited

U.S. PATENT DOCUMENTS

| | | | | |
|---|---|---|---|---|
| 4,951,973 | A | * | 8/1990 | Corsmeier ............ F01D 25/243 285/24 |
| 5,357,744 | A | | 10/1994 | Czachor et al. |
| 5,451,116 | A | | 9/1995 | Czachor et al. |
| 6,672,833 | B2 | | 1/2004 | MacLean et al. |
| 7,018,173 | B2 | * | 3/2006 | Bongrand ............... F01D 9/042 415/190 |
| 8,182,216 | B2 | | 5/2012 | Lhoest |
| 8,646,744 | B2 | * | 2/2014 | Duchatelle ............... F01D 9/04 248/637 |
| 9,399,924 | B2 | * | 7/2016 | Klingels ............... F01D 11/005 |
| 9,726,042 | B2 | * | 8/2017 | Sasse ........................ F02C 7/20 |
| 2005/0118020 | A1 | * | 6/2005 | Kirk ...................... F01D 25/243 415/214.1 |
| 2012/0328365 | A1 | * | 12/2012 | Care ..................... F01D 21/045 403/337 |
| 2015/0330308 | A1 | * | 11/2015 | Goupil ................. F01D 25/243 415/144 |

FOREIGN PATENT DOCUMENTS

GB 2280484 2/1995
WO WO2010/007220 1/2010

* cited by examiner

CONNECTION SYSTEM FOR HOUSING ELEMENTS OF A TURBINE INTERMEDIATE CASING

This claims the benefit of European Patent Application EP 16155900.0, filed Feb. 16, 2016 and hereby incorporated by reference herein.

BACKGROUND

The present invention relates to a connection system for a hot gas-conducting annular duct of a turbine intermediate casing of a gas turbine, in particular an aircraft gas turbine, including a first housing element, in particular a panel of a turbine intermediate casing, a second housing element, in particular a fairing of a turbine intermediate casing, which is situated next to the first housing element in the circumferential direction, a fastening unit which is configured for connecting the first housing element and the second housing element to one another at edges of the first housing element and of the second housing element, which are adjacent to one another in the circumferential direction, the fastening unit including a clamping element which is mounted on the one housing element with the aid of a connection means, in particular a bolt-nut connection, the clamping element resting on a clamping surface provided on the other housing element in such a way that the other housing element is accommodated between the clamping element and the one housing element. Such a connection system is known, for example, from U.S. Pat. No. 5,451,116 A.

It is pointed out that directional information such as "axial", "radial", and "circumferential" are intended to be understood to relate, in principle, to the machine axis of the gas turbine, as long as nothing else results, explicitly or implicitly, from the context.

A turbine intermediate casing (turbine center frame or TCF), in particular its portion which delimits the hot gas duct, typically includes a plurality of housing elements which may be referred to as panels and fairings (for the aerodynamic encasing of the struts). These housing elements are connected to one another with the aid of bolted/clamping connections, so-called "dorito connections." The housing elements or fairings and panels, together, define the annular gas duct for conducting the hot gas from the high-pressure turbine into the low-pressure turbine. Such a design based on clamping is selected in order allow for thermally induced relative motions, within certain limits, between the fairings and panels when the gas turbine transitions from one operating state into another operating state, without generating impermissibly high stresses in the fairings and panels.

SUMMARY OF THE INVENTION

In practical application, however, it has been shown that the curved housing elements, in particular the panels, decamber to a certain extent when they become hot during operation. As soon as the housing elements cool down again, they assume their original shape. Each housing element, in particular panel, is held along the axial direction with the aid of multiple, preferably three clamping connections (doritos) situated at a distance from one another. Due to the decambering occurring during operation, one clamping element of the clamping connections no longer rests straight on a counter-clamping surface on the housing element or panel. As a result, the clamping element may slip along the "tilted plane" of the decambered housing element or panel. This results in high local actions of force on the counter-clamping surfaces on the housing elements or panels and in corresponding wear. In practical application, this disadvantageous effect is particularly highly apparent on radially outer housing elements or panels in the downstream clamping connections or dorito connections, and on the radially inner housing elements or panels in the upstream clamping connections or dorito connections.

An object of the present invention is to provide a connection system which reduces or avoids the aforementioned disadvantages.

In order to achieve this object, it is provided that the top side of the clamping surface facing the clamping element has a clamping surface contour—relative to a longitudinal section which extends along, in particular essentially parallel to, the adjacent edges of the two housing elements—which is designed in such a way that it thwarts a rotation of the clamping element about an axis of the connection means. In particular, the longitudinal section which passes through the clamping surface should lie in a meridial plane, i.e., a plane which includes the rotational axis or machine axis of the gas turbine.

Due to a corresponding design of the clamping surface contour, the effect of a decambering of the housing element, in particular in the area of the fastening unit, may be compensated for, so that, despite a decambering which occurs, no disadvantageous relative motion between the clamping element and the clamping surface occurs.

As a refinement, it is provided that the clamping surface contour has at least one clamping surface contour section which has a slope which differs from a slope of a surface contour of a surface section of the housing element surrounding the clamping surface. The surface contour of the surface section surrounding the clamping surface, to which reference is made here, is preferably formed essentially in parallel to an inner surface section which is opposite the clamping surface contour section and defines the annular hot gas duct. The housing element surrounding the clamping surface therefore preferably does not have a constant wall thickness in the area of the clamping surface.

The slope of the clamping surface contour is selected in such a way that it is formed opposite to a decambering direction, so that the decambering which occurs may be compensated for by the changed slope of the clamping surface. In particular, the slope of the clamping surface is selected in such a way that, in one preferred operating state of the gas turbine, for example, a cruising flight state of an aircraft engine, in which a decambering of the housing element surrounding the clamping surface occurs, a longitudinal axis of the connection means, in particular a longitudinal axis of a bolt of the connection means, as represented in U.S. Pat. No. 5,451,116 A mentioned at the outset, is oriented—in the contact point with the clamping surface—essentially orthogonally to the clamping surface contour. In this way, a "slipping" of the clamping element on a "tilted plane" of the clamping surface and associated wear in the aforementioned operating state may be thwarted.

It is preferred that the clamping surface contour is a straight line which is slanted relative to a straight line of the surface contour, the line of the clamping surface contour and the line of the surface contour forming an angle of approximately 0.7° to 1.7°, preferably 1.0° to 1.4°.

Alternatively to a straight-line, changed slant, it is also possible that the clamping surface contour has at least one curved line section in such a way that a distance between the clamping surface contour and the surface contour increases.

Both the clamping surface, which is slanted in a straight line, and the curved or bent clamping surface improve the retention of a desirable relative position of the clamping element and the clamping surface. In particular, a rotational motion of the clamping element is thwarted via an area of the clamping surface which is raised relative to the surface contour.

A clamping section of the clamping element resting on the clamping surface is preferably spherical, in particular in the manner of a spherical element, so that a point contact is formed between the clamping element and the clamping surface.

The present invention further also relates to a turbine intermediate casing for a gas turbine, in particular an aircraft gas turbine, including a hot gas-conducting annular duct which is formed by multiple housing elements situated next to one another in the circumferential direction, the annular duct being delimited in the circumferential direction by radially inner housing elements and radially outer housing elements, multiple strut lining elements extending between the inner housing elements and the outer housing elements, being distributed in the circumferential direction and extending through the annular duct in the radial direction, and the inner housing elements and the outer housing elements each being formed by multiple first housing elements and multiple second housing elements, and the turbine intermediate casing including at least one above-described connection system.

In other words, the turbine intermediate casing may therefore include multiple fastening units which are configured for connecting adjacent housing elements to one another at their edges which are adjacent to one another in the circumferential direction, a particular fastening unit including a clamping element which is mounted on a first housing element with the aid of a connection means, in particular a bolt-nut connection, the clamping element resting on a clamping surface provided on an adjacent second housing element in such a way that the second housing element is accommodated between the clamping element and the first housing element, at least one of the clamping surfaces of the second housing element having a top side which faces the assigned clamping element of the first housing element and has a clamping surface contour relative to an axial longitudinal section which is designed in such a way that it thwarts a rotation of the clamping element about an axis of the connection means.

As a refinement, it is provided that a first housing element and a second housing element are connected to one another via multiple, in particular three, fastening units which are distributed in the axial direction.

It is preferred, in the case of radially outer housing elements, that the last fastening unit in the flow direction has a clamping surface contour which thwarts the rotation of the clamping element.

In the case of radially inner housing elements, the first fastening unit in the flow direction may have a clamping surface contour which thwarts the rotation of the clamping element.

As already mentioned above with respect to the connection system, in the case of a turbine intermediate casing, the clamping surface contour may have at least one clamping surface contour section which has a slope which differs from a slope of a surface contour of a surface section of the second housing element surrounding the clamping surface.

Furthermore, it is preferred that the clamping surface contour is a straight line which is slanted relative to a straight line of the surface contour, the line of the clamping surface contour and the line of the surface contour forming an angle of approximately 0.7° to 1.7°, preferably 1.0° to 1.4°

In the case of the turbine intermediate casing as well, the clamping surface contour may have at least one curved line section in such a way that a distance between the clamping surface contour and the surface contour increases.

Alternatively, in the case of the turbine intermediate casing, the particular clamping sections of the clamping elements resting on an assigned clamping surface may be spherical, in particular in the manner of a spherical element, so that a point contact is formed between the clamping element and the clamping surface.

BRIEF DESCRIPTION

The present invention is described in the following, by way of example and in a non-limiting manner, with reference to the attached figures.

DETAILED DESCRIPTION

Figure 1:
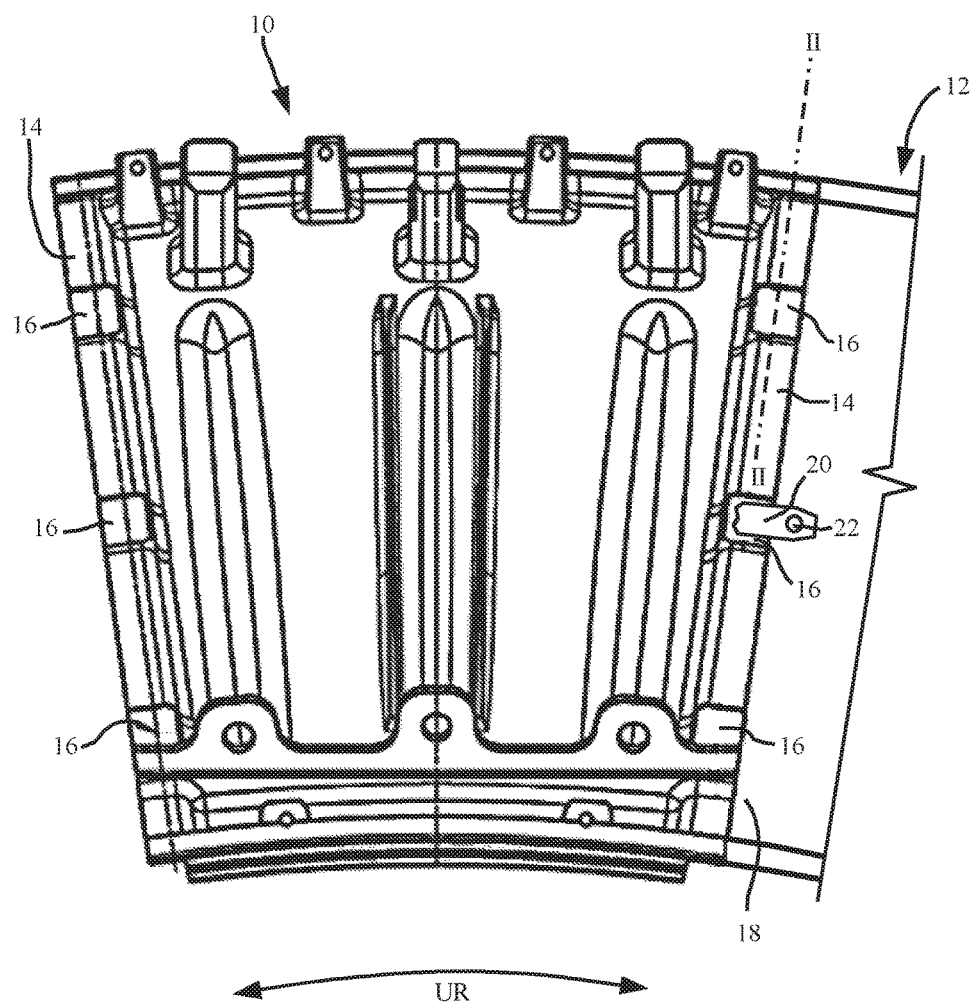
FIG. 1 shows, schematically and simplified, a perspective view of a housing element.

FIG. 1 shows, schematically and in a simplified manner, a first housing element 10 of a turbine intermediate casing which is not represented further. First housing element 10 may also be referred to as a so-called panel. First housing element 10 adjoins, in circumferential direction UR, a second housing element 12 which is merely indicated. Second housing element 12 may be, for example, a so-called fairing, i.e., a housing component which, on the one hand, delimits the hot gas-conducting annular duct of the turbine intermediate casing and, on the other hand, surrounds struts or lines extending through this annular duct.

First housing element 10 includes multiple clamping surfaces 16 on each of its edges 14 which are situated opposite one another in circumferential direction UR. Preferably, three clamping surfaces 16 are provided along a particular edge 14. On second housing element 12, clamping elements 20, only one of which is depicted highly simplified, are mounted on particular edges 18. Clamping elements 20 are preferably fastened on second housing element 12 with the aid of a bolt-nut connection 22 which is depicted here in a simplified manner as a circle. One clamping element 20 and one assigned clamping surface 16 may also be referred to as one fastening unit which is used for connecting first housing element 10 and second housing element 12 to one another. The fastening units are designed, in particular, in such a way that clamping surfaces 16 are accommodated between clamping element 20 and an edge of second housing element 12, which is not visible in the representation.

Figure 2:
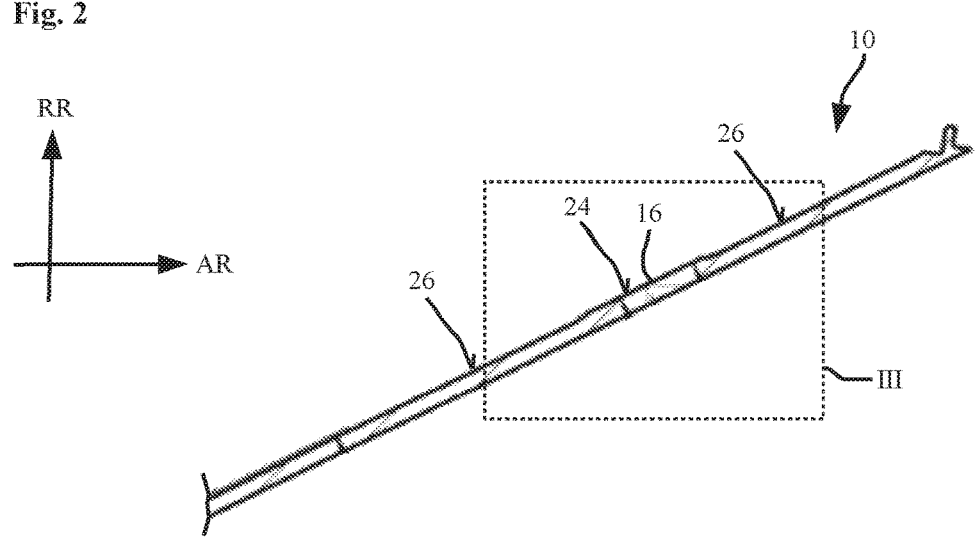
FIG. 2 shows a partial sectional representation of the housing element corresponding to the intersection line II-II.

FIG. 2 shows a partial sectional representation along intersection line II-II which extends along or essentially in parallel to edge 14 of first housing element 10. Cut clamping surface 16 is the last clamping surface—downstream in the axial direction—on first housing element 10. FIG. 2 shows first housing element 10 including clamping surface 16 in the embodiment known so far. In this case, clamping surface contour 24 of clamping surface 16 is essentially parallel to a surface contour 26—which surrounds clamping surface 16—of first housing element 10 or its edge 14. In FIG. 2, a rectangle formed by a dotted line indicates an area which is depicted in FIGS. 3A and 3B in an enlarged view, FIGS. 3A and 3B representing specific embodiments of the present invention.

Figure 3A:
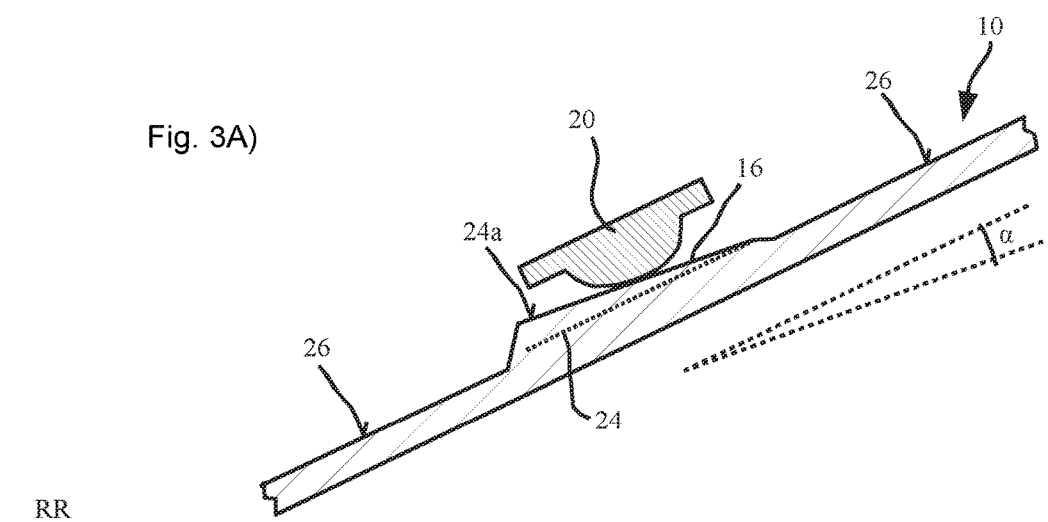
FIGS. 3A and 3B show, respectively, alternative specific embodiments of a clamping surface of the housing element from FIGS. 1 and 2.
Figure 3B:
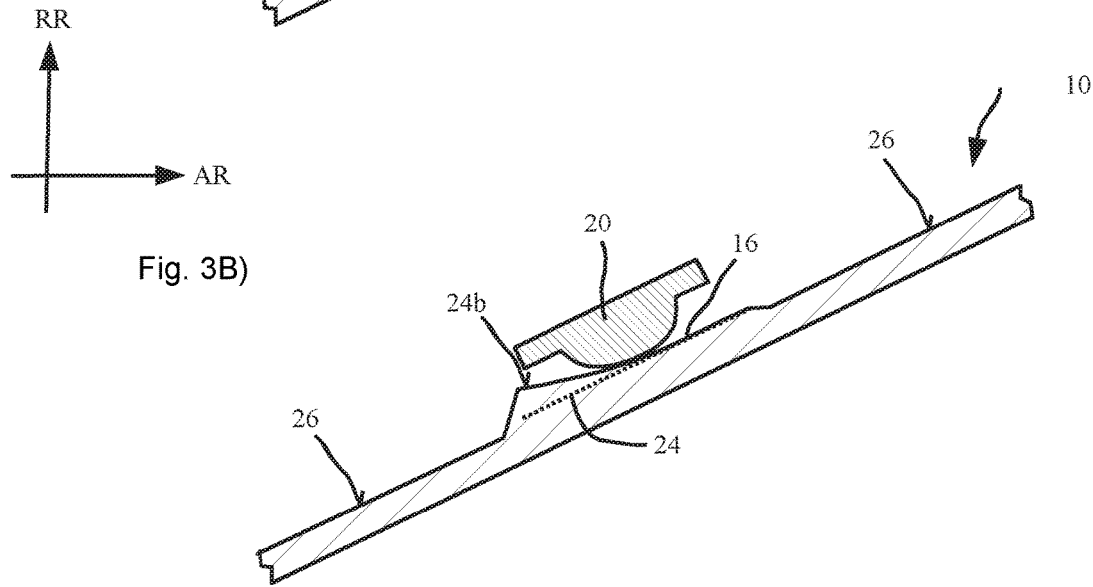

Clamping surface 16 is depicted in an enlarged view in FIGS. 3A and 3B. A dotted line represents the known course of clamping surface contour 24, which is apparent in FIG. 2.

In FIG. 3A, clamping surface 16 has a changed clamping surface contour 24a which is slanted relative to surrounding surface contour 26. The slant represented in FIG. 3A is not shown correctly to scale, for illustration purposes. An angle A formed by clamping surface 16 or its clamping surface contour 24a and surface contour 26 is preferably approximately 0.7° to 1.7°, in particular in a range of 1.0° to 1.4°. On a length of the clamping surface contour of, for example, 50 mm, this corresponds to a slope of approximately 0.6 mm to 1.5 mm.

A clamping element 20 which rests with a clamping section 28 on clamping surface 14 is also represented, in a greatly simplified and schematic manner, in FIGS. 3A and 3B. The clamping section is preferably spherical, in particular designed in the manner of a spherical element, so that a contact point is formed between clamping element 20 and clamping surface 16 or clamping surface contour 24a. As is apparent in FIG. 3A, slanted clamping surface contour 24a prevents clamping element 20 from slipping in axial direction AR or prevents a rotation of the clamping element about bolt-nut connection 22 (FIG. 1). In the case of a so-called decambering of housing element 10 during operation of the gas turbine, clamping surface contour 24a moves in the direction of the position of conventional clamping surface contour 24 (dashed line). Due to the slant of clamping surface contour 24a, it may be ensured, however, despite this decambering, that slipping of clamping element 20 may also be prevented in the decambered state of housing element 10.

FIG. 3B shows one alternative specific embodiment of clamping surface contour 24b. In this example, clamping surface contour 24b has a curved or bent shape. In FIG. 3B as well, the radius of curvature is not shown to scale, for illustration purposes. The radius of curvature of clamping surface contour 24b may be the same along the entire axial length of clamping surface 16, so that clamping surface contour 24b describes a portion of a circular arc. Alternatively, sections of the radius of curvature may also be different, so that clamping surface contour 24b is designed in the shape of a parabola. The curvature is designed concavely relative to clamping element 20. As already described above with respect to the specific embodiment of FIG. 3A, the curved clamping surface contour should also be selected in such a way that the maximum slope along an exemplary length of the clamping surface contour of 50 mm is no more than approximately 0.6 mm to 1.5 mm.

A feature common to the specific embodiments of both FIGS. 3A and 3B is that they have a different slope as compared to surrounding surface contour 26. In other words, it may also be stated that the clamping surface contour (in the slanted case) or a tangent (in the curved case) applied to the clamping surface contour form, with axial direction AR or radial direction RR, a different angle than surrounding surface contour 26 of housing element 10, in particular its edge 14.

The specific embodiment represented in FIG. 3B shows a clamping surface contour 24b which is curved in such a way that a thickness of first housing element 10, in the area of clamping surface contour 24b, decreases continuously in the axial or flow direction from the upstream end of clamping surface contour 24b (on the left in FIG. 3B) toward the downstream end of clamping surface contour 24b (on the right in FIG. 3B). In one alternative specific embodiment, the clamping surface contour may also be curved in such a way, however, that a point of the smallest thickness of first housing element 10 in the area of the clamping surface contour is located approximately in the middle, in the axial or flow direction, between the upstream end of clamping surface contour 24b (on the left in FIG. 3B) and the downstream end of clamping surface contour 24b (on the right in FIG. 3B). In other words, the thickness increases toward the edge regions in the axial or flow direction of the clamping surface contour. A better rotation lock may therefore be implemented.

In the circumferential direction of first housing element 10 (orthogonally to the image plane of FIGS. 3A and 3B), the thickness of first housing element 10 preferably does not change in the area of clamping surface contour 24a, 24b. In particular cases, however, it may also be advantageous here to provide a thickness which changes in the circumferential direction.

The slant or curvature of clamping surface contour 24a, 24b may also be designed in such a way, in addition to having the effect of preventing slipping of clamping element 20, that the slant or curvature applies a type of restoring force onto the clamping element, so that the clamping element is moved into its original clamping position or into its intended relative position with respect to the clamping surface, in particular when housing element 10 transitions from a decambered state during operation of the gas turbine back into a cambered state, in particular during a standstill of the gas turbine.

The connection system presented here, which has a slanted or curved clamping surface contour, may be provided on all clamping surfaces of a first housing element. Alternatively, it is also possible that only certain clamping surfaces are designed to be slanted or curved, in particular those clamping surfaces that have been shown, from experience, to have a particularly high risk of the clamping elements slipping. The connection system presented was explained using the example of housing elements 10, 12. Such a connection system may also be used, however, on radially inner housing elements of a turbine intermediate casing.

In the case of radially outer housing elements 10, 12 (FIGS. 1, 4), the slanted or curved clamping surface contour may be provided, in particular, on the last connection system in the flow direction. In FIG. 1, this corresponds to clamping surfaces 16 represented at the top left and right of housing element 10, of which the right clamping surface is also illustrated in the sectional representation of FIGS. 2, 3A and 3B.

In the case of radially inner housing elements 30 the first fastening unit or connection system in the flow direction may have a clamping surface contour which thwarts the rotation of the clamping element. Similar to FIG. 1, this would be, for example, the clamping surfaces situated at the bottom left and right.

The slanted or curved clamping surface contour may be produced, for example, by removal of material from the conventional clamping surface. In order to prevent a weakening of the structure of the housing element, however, the slanted or curved clamping surface contour may also be produced by casting a housing element, or a contact section may be or is provided on the unmachined cast part, which is already thickened compared to the prior art, which makes it possible to create the slanted or curved clamping surface contour by mechanical secondary machining, without falling below a minimum wall thickness required for the structural stability.

Figure 4:
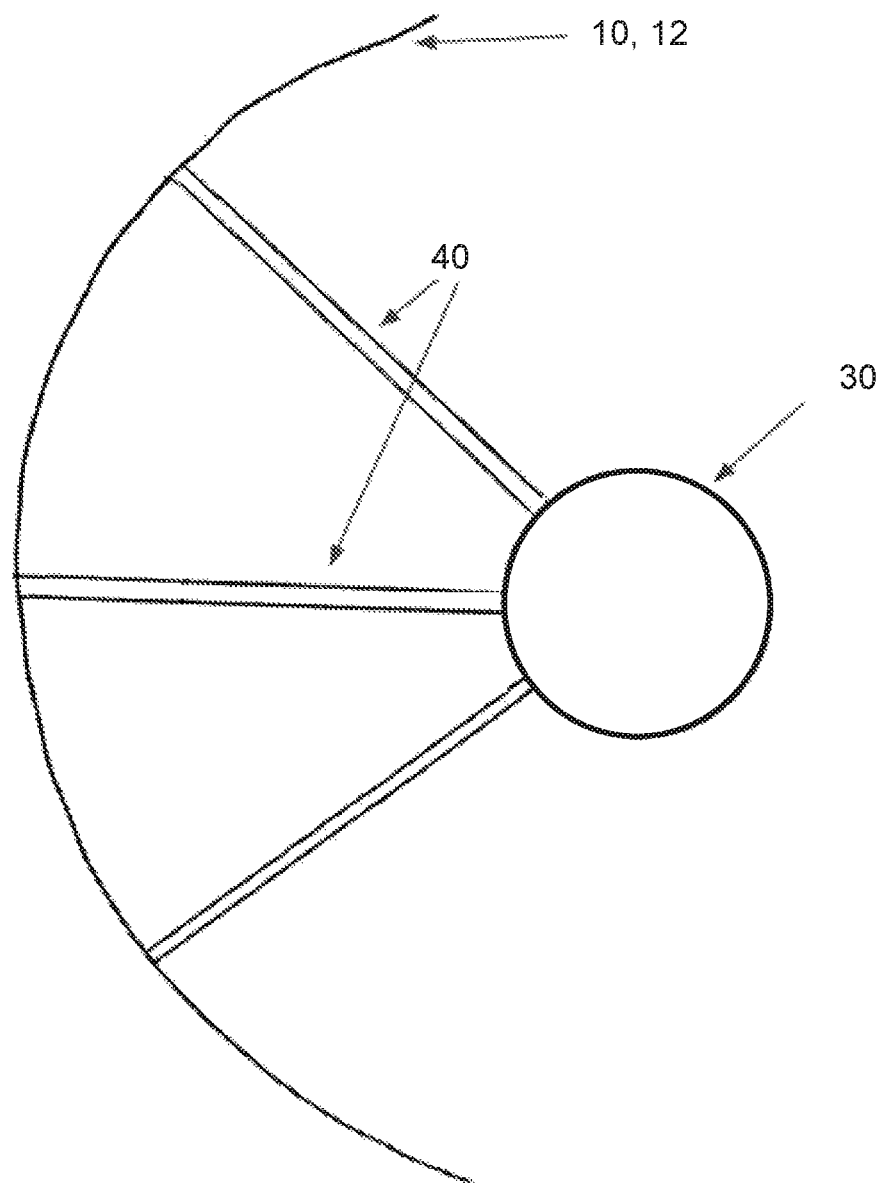
FIG. 4 shows the inner and outer housing connected by struts.

FIG. 4 shows inner housing elements 30 and outer housing elements 10, 12, multiple strut lining elements 40, extending between the inner housing elements and the outer housing elements.

LIST OF REFERENCE NUMERALS 10 first housing element
12 second housing element
14 edge
16 clamping surface
18 edge
20 clamping element
22 bolt-nut connection
24, 24a, 24b clamping surface contour
26 surface contour
28 clamping section
AR axial direction
RR radial direction
UR circumferential direction

What is claimed is:

1. A connection system for a hot gas-conducting annular duct of a turbine intermediate casing of a gas turbine, the connection system comprising:
a first housing element;
a second housing element situated next to the first housing element in a circumferential direction; and
a fastening unit configured for connecting the first housing element and the second housing element to one another at adjacent edges of the first housing element and of the second housing element adjacent to one another in the circumferential direction, the fastening unit including a clamp mounted on the second housing element with the aid of a connection, the clamp resting on a clamping surface provided on the first housing element in such a way that the first housing element is accommodated between the clamp and the second housing element;
a top side of the clamping surface facing the clamp has a clamping surface contour, relative to a longitudinal section extending along the adjacent edges, designed in such a way to thwart a rotation of the clamp about an axis of the connection.

2. The connection system as recited in claim 1 wherein the clamping surface contour has at least one clamping surface contour section with a slope differing from a further slope of a surface contour of a surface section of the first housing element surrounding the clamping surface.

3. The connection system as recited in claim 2 wherein the clamping surface contour is a straight line slanted relative to a straight line of the surface contour, the line of the clamping surface contour and the line of the surface contour forming an angle of 0.7° to 1.7°.

4. The connection system as recited in claim 3 wherein the angle is 1.0° to 1.4°.

5. The connection system as recited in claim 2 wherein the clamping surface contour has at least one curved line section in such a way that a distance between the clamping surface contour and the surface contour increases.

6. The connection system as recited in claim 1 wherein a clamping section of the clamp resting on the clamping surface is spherical, a contact point being formed between the clamp and the clamping surface.

7. The connection system as recited in claim 1 wherein the connection system is an aircraft gas turbine connection system.

8. The connection system as recited in claim 1 wherein the first housing element is one of a panel of a turbine intermediate casing and a fairing of a turbine intermediate casing, and the second housing element is the other of the panel and the fairing.

9. The connection system as recited in claim 1 wherein the first housing element is a panel of a turbine intermediate casing and the second housing element is a fairing of a turbine intermediate casing.

10. The connection system as recited in claim 1 wherein the connection is a bolt-nut connection.

11. The connection system as recited in claim 1 wherein the longitudinal section extends parallel to the adjacent edges.

12. A turbine intermediate casing for a gas turbine, the turbine intermediate casing comprising:
a hot gas-conducting annular duct formed by multiple housing elements situated next to one another in the circumferential direction, the annular duct being delimited in the circumferential direction by radially inner housing elements and radially outer housing elements, multiple strut lining elements, extending between the inner housing elements and the outer housing elements, being distributed in the circumferential direction and extending through the annular duct in the radial direction, and the inner housing elements and the outer housing elements each being formed by multiple first housing elements and multiple second housing elements, wherein the turbine intermediate casing includes at least one connection system as recited in claim 1.

13. The turbine intermediate casing as recited in claim 12 wherein a first housing element of the multiple housing elements and a second housing element of the second housing elements are connected to one another via multiple fastening units distributed in the axial direction.

14. The turbine intermediate casing as recited in claim 13 wherein the number of multiple fastening units is three.

15. The turbine intermediate casing as recited in claim 12 wherein in the case of radially outer housing elements, a last fastening unit in the flow direction has a clamping surface contour thwarting the rotation of the clamp.

16. The turbine intermediate casing as recited in claim 12 wherein in the case of radially inner housing elements, a first fastening unit in the flow direction has a clamping surface contour thwarting the rotation of the clamp.

17. An aircraft gas turbine comprising the turbine intermediate casing as recited in claim 12.

* * * * *